(12) United States Patent
Kasilingam et al.

(10) Patent No.: US 11,953,584 B2
(45) Date of Patent: Apr. 9, 2024

(54) THREE-DIMENSIONAL LOCATION ESTIMATION USING MULTIPLICATIVE PROCESSING OF SENSOR MEASUREMENTS

(71) Applicants: University of Massachusetts, Boston, MA (US); Matthew J. Curtis, Millbury, MA (US); Murilo Souza Silva, Jr., Holden, MA (US)

(72) Inventors: Dayalan P. Kasilingam, South Dartmouth, MA (US); Matthew J. Curtis, Millbury, MA (US); Murilo Souza Silva, Jr., Holden, MA (US)

(73) Assignee: University of Massachusetts, Boston, MA (US)

( * ) Notice: Subject to any disclaimer, the term of this patent is extended or adjusted under 35 U.S.C. 154(b) by 606 days.

(21) Appl. No.: 17/257,539

(22) PCT Filed: Jul. 3, 2019

(86) PCT No.: PCT/US2019/040609
§ 371 (c)(1),
(2) Date: Dec. 31, 2020

(87) PCT Pub. No.: WO2020/010257
PCT Pub. Date: Jan. 9, 2020

(65) Prior Publication Data
US 2021/0364621 A1    Nov. 25, 2021

Related U.S. Application Data

(60) Provisional application No. 62/694,778, filed on Jul. 6, 2018.

(51) Int. Cl.
*G01S 13/42*    (2006.01)
*G01S 3/74*    (2006.01)
(Continued)

(52) U.S. Cl.
CPC ............... *G01S 13/42* (2013.01); *G01S 3/74* (2013.01); *G01S 7/2925* (2013.01); *G01S 7/2926* (2013.01); *G01S 7/41* (2013.01)

(58) Field of Classification Search
CPC .......... G01S 3/74; G01S 13/42; G01S 7/2925; G01S 7/2926; G01S 7/41; G01S 13/06; G01S 13/876; G01S 15/876
See application file for complete search history.

(56) References Cited

U.S. PATENT DOCUMENTS 4,862,180 A * 8/1989 Martin .................... G01S 13/42
                                                                342/158
6,084,540 A * 7/2000 Yu ............................ G01S 3/28
                                                                342/357.29

(Continued)

OTHER PUBLICATIONS

PCT International Preliminary Report on Patentability in International Appln. No. PCT/US2019/040609, dated Jan. 12, 2021, 7 pages.

(Continued)

*Primary Examiner* — Peter M Bythrow
(74) *Attorney, Agent, or Firm* — Fish & Richardson P.C.

(57) ABSTRACT

System, computer products, and methods can improve the resolution of data from a sensor array. One of these methods include receiving, from an analog to digital converter, a series of measurements representing frequency samples and spatial samples from a sensor array. The method includes generating a plurality of factors based on a polynomial. The method includes applying one or more complex weights to the measurements based on the factors. The method includes combining the complex weighted measurements into a plurality of values. The method also includes identifying a characteristic of an object detected by the sensor array based on the plurality of values.

20 Claims, 8 Drawing Sheets

(51) Int. Cl.
*G01S 7/292* (2006.01)
*G01S 7/41* (2006.01)

(56) References Cited

U.S. PATENT DOCUMENTS

| | | | | |
|---|---|---|---|---|
| 6,198,693 | B1* | 3/2001 | Marash | G01S 3/8083 |
| | | | | 342/417 |
| 6,215,983 | B1* | 4/2001 | Dogan | G01S 3/74 |
| | | | | 375/325 |
| 6,498,581 | B1* | 12/2002 | Yu | G01S 13/4463 |
| | | | | 342/147 |
| 6,697,633 | B1* | 2/2004 | Dogan | H04L 25/03993 |
| | | | | 455/450 |
| 6,907,128 | B2 | 6/2005 | Kimura et al. | |
| 7,705,761 | B2 | 4/2010 | Tietjen et al. | |
| 8,009,083 | B2 | 8/2011 | Shirakawa | |
| 8,379,485 | B2* | 2/2013 | Cevher | G01S 3/8006 |
| | | | | 367/128 |
| 9,444,558 | B1* | 9/2016 | Carbone | H04W 24/08 |
| 9,465,103 | B2* | 10/2016 | Sochen | G01S 13/58 |
| 9,559,417 | B1* | 1/2017 | Schwarzwalder | H01Q 3/2605 |
| 2003/0058153 | A1* | 3/2003 | Yu | G01S 7/2813 |
| | | | | 342/147 |
| 2008/0218404 | A1* | 9/2008 | Ma | G01S 13/0209 |
| | | | | 342/126 |
| 2009/0009394 | A1* | 1/2009 | Mestre Pons | G01S 3/74 |
| | | | | 342/417 |
| 2010/0001901 | A1* | 1/2010 | Baraniuk | G01S 7/32 |
| | | | | 342/25 F |
| 2010/0271254 | A1* | 10/2010 | Kanamoto | G01S 3/74 |
| | | | | 342/146 |
| 2012/0056886 | A1* | 3/2012 | Shiba | G01S 13/4418 |
| | | | | 702/159 |
| 2014/0111372 | A1* | 4/2014 | Wu | G01S 7/021 |
| | | | | 342/146 |
| 2015/0362580 | A1* | 12/2015 | Ha | G01S 3/74 |
| | | | | 342/417 |

OTHER PUBLICATIONS

PCT International Search Report and Written Opinion in International Appln. No. PCT/US2019/040609, dated Sep. 27, 2019, 12 pages.

* cited by examiner

THREE-DIMENSIONAL LOCATION ESTIMATION USING MULTIPLICATIVE PROCESSING OF SENSOR MEASUREMENTS

CROSS-REFERENCE TO RELATED APPLICATIONS

This application claims the benefit under 35 U.S.C. § 119(e) of the filing date of U.S. Patent Application No. 62/694,778, for SENSOR ARRAY BEAMFORMING AND RANGE PROFILING, which was filed on Jul. 6, 2018, and which is incorporated here by reference.

BACKGROUND

Wireless object-detection and classification systems utilize parameters extracted from propagating waves (for example, electromagnetic (EM) or acoustic waves) to determine the range, angle, or velocity of objects. Such systems can be used to detect aircraft, ships, spacecraft, guided missiles, motor vehicles, weather formations, and terrain, as well as other objects.

SUMMARY

In general, one innovative aspect of the subject matter described in this specification is implemented in methods that include the act of receiving, from an analog to digital converter, a series of measurements representing frequency samples and spatial samples corresponding to signals obtained from a sensor array. The method includes the act of generating a plurality of factors based on a polynomial. The method includes the act of applying one or more complex weights to the series of measurements based on the factors to generate complex weighted measurements. The method includes the act of combining the complex weighted measurements into a plurality of values. The method also includes the act of identifying a characteristic of an object detected by the sensor array based on the plurality of values.

Other implementations of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other implementations can each optionally include one or more of the following features, alone or in combination. The characteristic may be one of a direction of arrival or a range. Generating the plurality of factors may include determining a number of the series of measurements to use based on a signal to noise ratio. Burst averaging may be applied to the plurality of weighted measurements. The polynomial may be selected based on a target resolution. A plurality of proximate objects that are simultaneously detected by the sensor array may be identified based on the plurality of values. Identifying the plurality of proximate objects may include separately identifying each of the plurality of proximate objects at a respective distance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
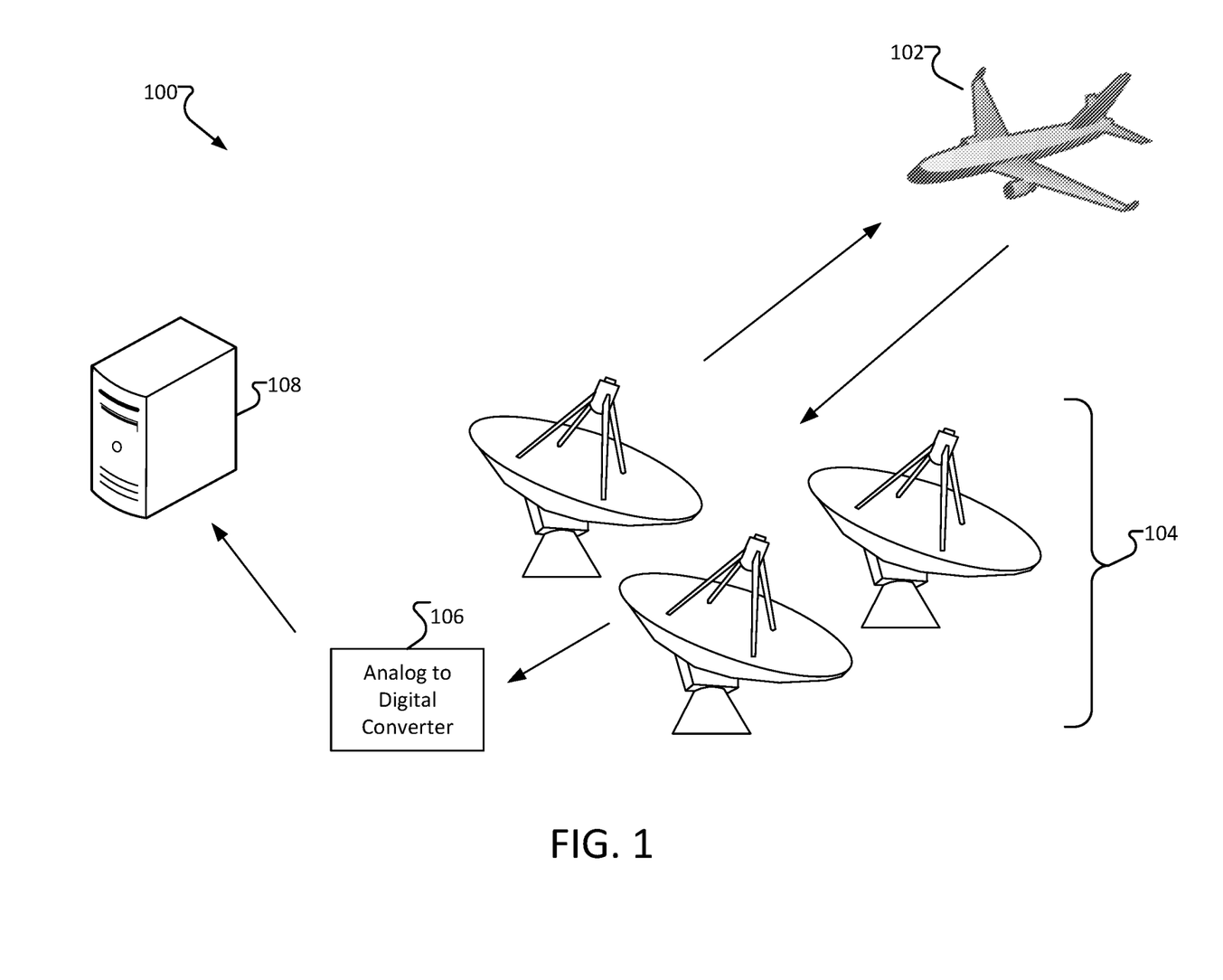
FIG. 1 illustrates an example system that uses signals from a sensor array for beamforming and range estimation.

FIG. 1 illustrates an example system 100 that uses signals from a sensor array for beamforming and range estimation. The system 100 includes an airborne moving object 102, one or more sensor elements 104, an analog to digital converter (ADC) 106, and a computer 108.

In some implementations, the one or more sensor elements 104 (referred to as a sensor array) send analog signals which bounce off the airborne moving object 102. The object 102 can be a spacecraft, e.g., an airplane. A portion of the analog signals, known as the echo, returns to the sensor element that provides those signals.

In some implementations, the analog signals are converted to frequencies that are suitable (e.g., low frequencies) for digitization, and these converted signals are then sampled by the ADC 106. The input to the ADC 106 may be, for example, a continuous time signal, while the output of the ADC 106 includes discrete values, or samples, of the original signal. For example, the analog signals can be sampled from a single stepped frequency waveform (SFW) at a rate equivalent to the inter-pulse period (IPP), and assuming steady-state response, the set of sampled amplitude and phase measurements relative to the transmitted waveform can be transformed into a series of discrete values.

In some implementations, the discrete values outputted by the ADC 106 are processed by the computer 108 to determine the direction and distance of the object 102.

In conventional wireless object-detection and classification applications, the analog signals from the sensor elements are processed using linear, additive processing techniques for beamforming. In these conventional systems, the output for both range profiling and spatial beamforming can be represented as $$y[l] = \sum_{n=0}^{N-1} x^n = 1 + x + x^2 + x^3 + x^4 + \ldots + x^{N-1} \quad (1)$$

where N is the number of measurements and, $x^n = e^{j2\pi n \Delta f [t(l) - t_D]}$ for range profiling, where $\Delta f$ is the frequency increment of the measurements and $t_D$ is the time delay, which is related to the range, R, by $t_D=2R/c$, and, $x^n = e^{jnk_0\Delta[\sin\theta(l) - \sin\theta_0]}$ for spatial beamforming, where $\Delta$ is the spatial separation of the measurements, $\theta_0$ is the direction of arrival, and $k_0$ is the propagation constant which is related to the wavelength, $\lambda$, by $k_0 = 2\pi/\lambda$.

In contrast to the conventional systems, in some implementations, efficiency is improved by using multiplicative processing for combining the signals from the antenna array 104 for beamforming. In such implementations, the linear expansion of equation (1) is factorized as:

$$y[l] = (1 + x + x^2 + x^3 + x^4 + \cdots + x^{N-1}) \quad (2)$$
$$= (x + \xi_1) \times (x + \xi_2) \times (x + \xi_3) \times \ldots \times (x + \xi_{N-1})$$

where $\xi_n = a_n \pm jb_n$ are the N−1 complex roots of the $(N-1)^{th}$ order polynomial.

A copy of y[l] is obtained by substituting two measurements ($x_0$ and $x_1$) in each factor as $$y[l] = (x_1 + \xi_1 x_0) \times (x_1 + \xi_2 x_0) \times \ldots \times (x_1 + \xi_{N-1} x_0)$$

where $x_0 = 1$ and $x_1 = e^{j2\pi\Delta f[t(l) - t_D]}$ for range profiling and, $x_0 = 1$ and $x_1 = e^{jk_0\Delta[\sin\theta(l) - \sin\theta_0]}$ for beamforming.

These factors may be recombined as discussed in more detail further below.

The multiplicative or product processing technique is applied to both range profiling applications, such as stepped frequency measurements, and direction-of-arrival (DoA) estimation where sensor arrays are used. In the first application, range is estimated by estimating the time delay of the sensor signal and thus, the application of product processing for range profiling is called Time Delay Product Processing (TDPP). In the second application, DoA is estimated using beamforming of measurements from spatially distributed sensor arrays and is known as Array Product Processing (APP).

For beamforming applications, the new array product processing (APP) method is derived from standard array processing analysis. In some implementations, the measurements are from a one-dimensional, N-element uniform linear array (ULA). In other implementations, the multiplicative processing technique is applied to two-dimensional scenarios.

For a single source, the measurements from the $n^{th}$ element is described by $s_n = \rho_0 e^{j\phi n}$, where the phase is given by $\phi_n = k_0 n \Delta \sin\theta_0$, $\rho_0$, is the complex amplitude of the source, $\theta_0$ is the direction of arrival (DoA) angle and $k_0$ is the propagation constant. $\Delta$ is the distance between the sensor elements. The different measurements from all N elements can be represented by the measurement vector $s = [s_1\ s_2\ \ldots\ S_N]^T$. These measurements are combined linearly by projecting the measurement vector on to a steering vector, $\alpha$, representing a particular direction of arrival (DoA). This projection can be written as $$y(\theta_0) = \alpha^T s = \sum_{n=1}^{N} \rho_0 e^{jk k_0 n\Delta[\sin\theta - \sin\theta_0]} \quad (3)$$

where $\theta_0$ is the DoA angle. By projecting the measurements over a set of steering vectors corresponding to a range of DoA angles, a spectrum is generated over these angles. For a single source, the measurements from each element is related to the measurements from the adjacent elements by $s_n = s_{n-1} e^{j\Delta\phi}$ where $\Delta\phi = k_0 \Delta \sin\theta_0$ and $\Delta$ is the inter-element spacing. Representing equation (3) in a closed form solution yields $$y(\theta_0) = \sum_{n=1}^{N} \rho_0 e^{jk_0 n\Delta[\sin\theta - \sin\theta_0]} = \rho_0 \sum_{n=1}^{N} x^n = \rho_0 \frac{1 - x^N}{1 - x} \quad (4)$$

where $x = e^{jk_0\Delta(\sin\theta - \sin\theta_0)}$.

In some implementations, the system 100 applies the new APP technique to produce beamforming capability that is commensurate with results from much longer arrays than the sensor array 104. Unlike previous multiplicative processing techniques, the APP method uses the product of multiple linearly combined signals from the same set of sensor array measurements. Multiple signals are generated from the same set of array measurements; by combining the signals differently, comparable resolution is achieved commensurate with linear processing.

For example, if $N = 2^m$, then $y(\theta_0)$ can be factorized into m factors as $$y(\theta_0) = \rho_0 (1 + x^{N/2}) \times (1 + x^{N/4}) \times \ldots \times (1 + x)$$

Each factor may be viewed as representing a sub-array that is generated using measurements from pairs of sensor elements separated by different distances. The phase spectrum from linear processing is equivalent to the phase spectrum generated by multiplying the m factors, which represent m pairs of sub-arrays.

The APP processing with multi-element ULA with an inter-element spacing of $\lambda/2$ and a processing gain of 8 has comparable performance with linear processing of measurements with 8 times as many elements. APP processing of measurements from an N-element ULA with a processing gain of M is equivalent to linear processing of measurements from a MN-element ULA.

In some implementations, similar techniques are used for range finding applications. For example, the disclosed synthetic range-profile processing is a linear additive processing technique that is used to generate a range estimate with performance similar to the linear response using the matched filter operation.

Both simulations and actual radio frequency measurements in the following have shown that the performance of time-delay product processing (TDPP) can be equivalent and unrivaled when compared to linear processing for both the matched filter and synthetic range-profile processing. The amount of effective bandwidth used for range resolution is substantially reduced by using these techniques.

In some implementations, in the case of an SFW with N distinct frequency samples, the inverse discrete Fourier Transform (IDFT) is expanded in an equivalent form by $$y[l] = \sum_{n=0}^{N-1} x^n = 1 + x + x^2 + x^3 + x^4 + \ldots + x^{N-1} \quad (5)$$

A factorization method can also apply to the samples of the SFW. Since the number of coefficients in equation (5) is N, N can be expressed as a product of M irreducible positive integers $N_M$, $0 \leq m \leq M$, [16].

$$N = \prod_{m=0}^{M} N_M$$

The factorization of equation (5) is carried out using Euclid's algorithm and for the special case in which $N = 2^k$, where k is an integer, such that y[l] becomes $$y[l] = (1 + x^{N/2}) \times (1 + x^{N/4}) \times (1 + x^{N/8}) \times \ldots \times (1 + x^{N/N}) \quad (6)$$

Each factor consists of unity and a polynomial term in x. In some case, the factor is the linear processing of a sub-band where unity corresponds to the first frequency sample and the polynomial term, $x^m$, corresponds to the $(m+1)^{th}$ frequency sample. In y[l] in equation (6), the $(N-1)^{th}$ order polynomial has been reduced to all real factors; however, factors with a degree greater than one can be further reduced into complex factors that are equivalent.

For example, consider an SFW using a burst with N=8 frequencies with uniform amplitudes. Applying this waveform to equation (6) and expanding this in the form of equation to (5), the following polynomial expansion occurs $$y[l] = \sum_{n=0}^{7} x^n = 1 + x + x^2 + x^3 + x^4 + x^5 + x^6 + x^7 \quad (7)$$
$$= (1 + x + x^2 + x^3)(1 + x^4)$$
$$= (1 + x)(1 + x^2)(1 + x^4)$$

where the seventh order polynomial, corresponding to eight different frequency samples, can be factored in multiple ways. The factored form corresponds to the factorization method above. The coefficients in both the factorized and expanded form can be replaced by the frequency samples. They are then added and multiplied corresponding to the form of the designer's choosing. For example:

$$y[l] = (x_0 x_1)(x_0 + x_2)(x_0 + x_4) \quad (8)$$

where $x_n = e^{j2\pi n \Delta f [t(l) - t_D]}$, which demonstrates the spectral efficiency of TDPP. Rather than the linear combination of eight frequency samples, in such implementations, TDPP requires four distinct samples to be used to achieve equivalent results of the unfactored polynomial form. This corresponds to half the effective bandwidth used for achieving the same range resolution when compared to linear processing.

In some implementations, factors with a degree greater than one are reduced into a complex form. For example, since the factors $(1+x^2)$ and $(1+x^4)$ are factors with a degree greater than one, these can be further reduced into a complex form as $$y[l] = (x+1)(x+j)(x-j)(x+\xi_1) \times (x+\xi_2)(x+\xi_3)(x+\xi_4) \quad (9)$$

where $\xi_i$ is a complex weight of the form $\alpha \pm jb$, where $\alpha$ and b can be diverse, factor to factor, depending on the polynomial order. Given equation (9), substitution can be achieved using two frequency samples, as shown by equation (10):

$$y[l] = (x_1 + x_0)(x_1 + jx_0)(x - jx_0)(x_1 + \xi_1 x_0) \times (x_1 + \xi_2 x_0)(x_1 + \xi_3 x_0)(x_1 + \xi_4 x_0) \quad (10)$$

where one of the samples, in this case $x_0$, is weighted by either a complex value, j or $\xi_i$, or not weighted at all. These complex weights, therefore, require different modifications to the phase of the measurement. This reduces the polynomial into more factors, resulting in more multiplications of the same samples. However, this minimizes the number of samples used for achieving fine range resolution, such that the effective bandwidth is minimized. The minimum number of frequency samples to identify a single source is two. For K sources, (K+1) frequency samples are used.

As shown above, only two samples are used to identify a single source with range resolution commensurate with linear processing of eight samples. Considering a polynomial of any order, N, can be reduced to two components, TDPP can achieve resolution commensurate to an extremely wideband waveform by only using two frequency samples with an effective bandwidth of B=$\Delta f$. This in turn corresponds to a new Rayleigh range resolution $$\Delta R = \frac{c}{2M\Delta f} \quad (11)$$

where M is the order of the expanded polynomial before factorization and can have different values in different implementations of the system 100. $\Delta R$ depends on the order of the polynomial and not the operating bandwidth of the receiver. Similar restrictions for the SFW still apply in the choice of $\Delta f$ to avoid range aliasing, however, this technique is not limited to the SFW.

Considering the case of a range measurement from a single source using an SFW with N=32 and $\Delta f$=100 kHz, comparing it to the TDPP processing only requiring N=2 samples, it can shown that the effective bandwidth is reduced by 3 MHz. The order of the polynomial used with TDPP can be chosen to achieve extremely narrow range resolution capabilities that approach the features of a "thumbtack." The tradeoff for TDPP is that, the higher the order of the polynomial, the higher the processing capabilities of the receiver system required. The signal-to-noise improvement due to coherent, linear processing of N stepped frequencies is equal to N. However, if a lesser number of frequencies is used with TDPP, the signal-to-noise improvement will degrade and will be less than N.

In the manner described above, a polynomial used for linear processing with N frequency samples can be reduced to two samples for TDPP. This results in (N−1) factors in its fully reduced form. This reduced polynomial can be viewed in terms of its roots, or the value in which the factors, and therefore the entire function, reduces to zero.

Figure 2:
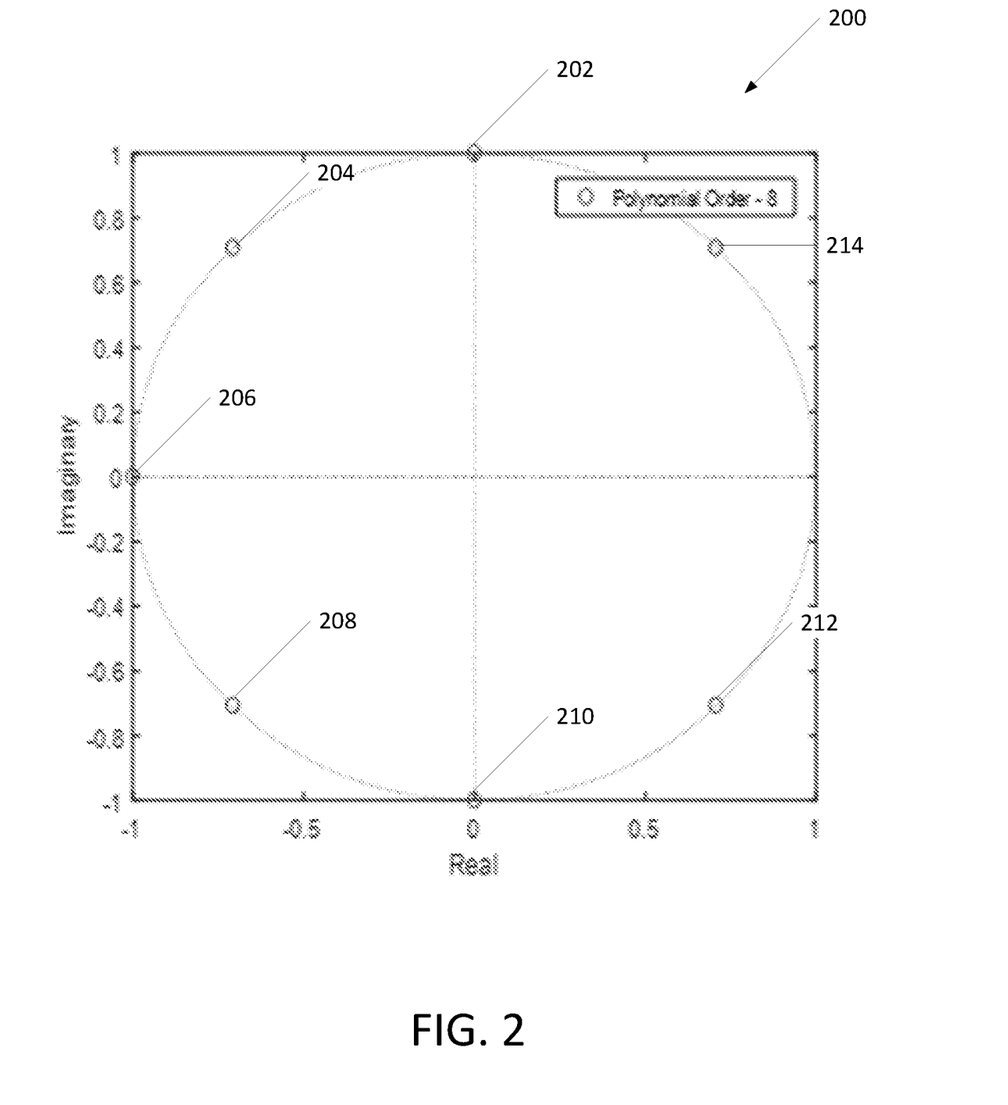
FIG. 2 is a graph illustrating roots of a factorized polynomial.
Figure 3:
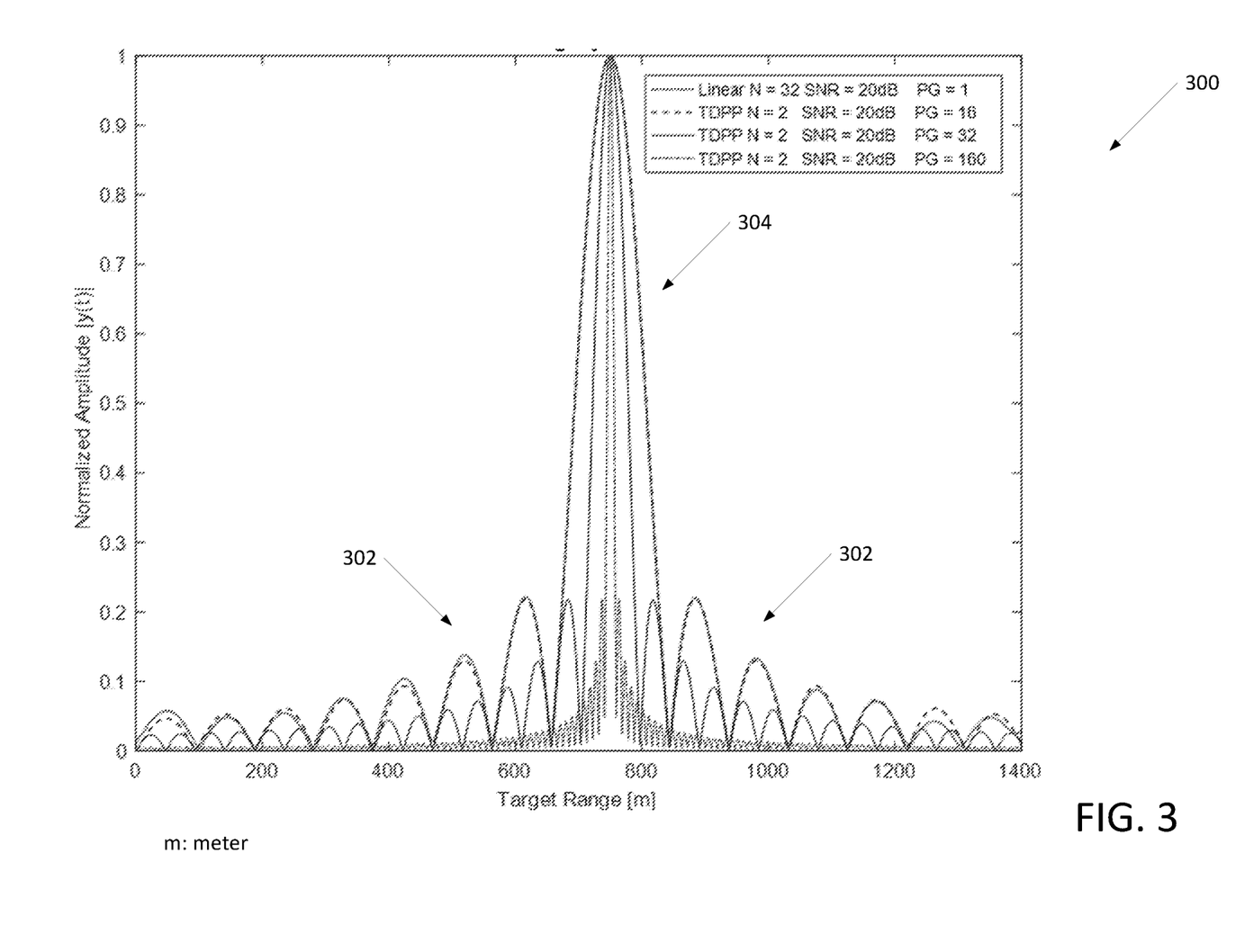
FIG. 3 is a graph illustrating ambiguity functions corresponding to different polynomial orders: uniform weighting.

FIG. 2 is a graph 200 illustrating roots of a factorized polynomial. As seen in FIG. 2, the factorized polynomial that had eight samples in its expanded form can be seen in terms of the seven roots (roots 202, 204, 206, 208, 210, 212, 214) of its fully reduced form. When using TDPP, these roots, or zeros, correspond to the nulls of the ambiguity function (AF), which describes the shape of the range profiling function. Referring to FIG. 3, these zeros can, therefore, be placed anywhere on the graph 300 to manipulate the side lobes 302 and main lobe 304 of the AF. Thus, multiple types of polynomials can be chosen by the designer to allow flexibility in the shape of the AF.

FIG. 3 is a graph 300 illustrating ambiguity functions corresponding to different polynomial orders: uniform weighting. The linear processing of 32 pulses is equivalent to TDPP for N=2 samples and a PG=16. Both result in a polynomial corresponding to 32 frequency samples when fully expanded. However, TDPP uses less samples, consequently, less effective bandwidth. Expanding the virtual polynomial by a PG=32 rather than 16, the blue trace demonstrates the estimate's increase in resolution by a factor of two. Normally, using linear processing, 64 frequency samples would be used to obtain this resolution. However, TDPP achieves this resolution using still only two samples. The reduction of bandwidth when using multiplicative processing in this case is 6.3 MHz. Taking this technique a step further, increasing the processing gain to PG=160, (i.e. 10× the baseline measurements) the green (innermost) curve in the graph 300 is produced. The reduction in bandwidth to achieve this fine resolution using TDPP, rather than the standard approach, is 31.9 MHz. This demonstrates enhanced resolution capabilities of TDPP that is no longer dependent on the effective bandwidth of the waveform, but the arbitrary polynomial order of the designer's choosing.

By employing the TDPP technique, the RF and microwave spectrum can be used for other applications, or can be used for the augmentation of existing ones. As described above, TDPP's ability to reduce the amount of measurements used to realize the results of standard linear processing introduces the decoupling of bandwidth and range resolution in a ranging system, and array aperture size and beamwidth in sensor arrays. This is done by modifying the phase of a sample many times and multiplying the combination of these "new" measurements to perform extremely fine resolution estimates. TDPP accordingly enables systems to outperform technologies that already exist, and enhance systems that are already developed.

In multiple approaches, in a high SNR environment, TDPP has similarly accurate performance as the standard linear processing approach. This was shown in different forms of the factorized polynomial in use. Identical results are achieved using multiplicative processing when utilizing fractions of the effective bandwidth needed for linear processing. Expanding this idea of using sub-bands to achieve commensurate range resolution, the reverse is true in which a "virtual" polynomial of any order can be factorized and produce super-resolution range-profiles of a target of interest far beyond what is physically possible for linear processing due to the restrictions and limitations associated with bandwidth allocation.

Conversely, when utilizing multiplicative processing in a low SNR environment, inaccuracies can occur when employing TDPP. As the SNR reduces, the range estimate becomes corrupted due to the small time-bandwidth product of the waveform and the additional phase associated with the random noise in the receiver system. However, in some implementations, a technique known as burst averaging, which is analogous to pulse averaging, is used to combat the low SNR environment by coherently integrating multiple bursts, consequently increasing the SNR and advertently remedying the range estimate that was originally degraded by contributions due to noise.

An advantage for using product processing is the flexibility in the design of the "virtual" polynomial. Not only can the order of the polynomial be arbitrarily chosen, but also the shape in the output pattern. Using uniform weighting for the polynomial, the first sidelobe is typically 13.6 dB down from the main lobe. Depending on the threshold level set for detection, this sidelobe level may be unwanted by the designer of the ranging system. The Dolph-Tschebyscheff polynomial and the Binomial expansion have a tremendous reduction and potential elimination of sidelobes in the range-profile and array pattern. Even with the natural broadening of the main lobe, this can be countered with the enhanced resolution associated with multiplicative processing. In future research, the flexibility in designing the polynomial can enhance the accuracy in the case of multiple targets.

When compared to standard processing, in some cases, using TDPP also reduces the processing time that is used for producing results. Due to the decoupling of bandwidth, the limitation of the two-step frequency waveform using TDPP depends only on the physical processing capabilities of the hardware that is used to determine the resolution of the system. Taking a comprehensive look at TDPP, along with the reduction of bandwidth used for enhanced range resolution, the complexity of the RF hardware involved has also significantly decreased for future systems when employing the TDPP technique. When using TDPP with only two frequency samples, the waveform still retains the advantage of the instantaneous bandwidth of the hardware being the Rayleigh bandwidth. However, less phase shifting operations are used between pulses to step the waveform in frequency. Additionally, when sampling the waveform, since fewer frequencies are involved, using TDPP reduces the strain on how precise the waveform needs to be sampled. The strain of the system now falls more on the digital components of the system which continue to improve in the modern world.

In some implementations, TDPP factorizes the polynomial having N frequency samples with uniform weighting. The processing is then applied to a single burst (i.e., one set of frequency measurements). Considering a case in a high signal to noise environment in which the SNR is 20 dB, or a sufficiently low noise environment, where the noise power can be considered negligible, TDPP is nearly identical to the standard linear processing.

Figure 4:
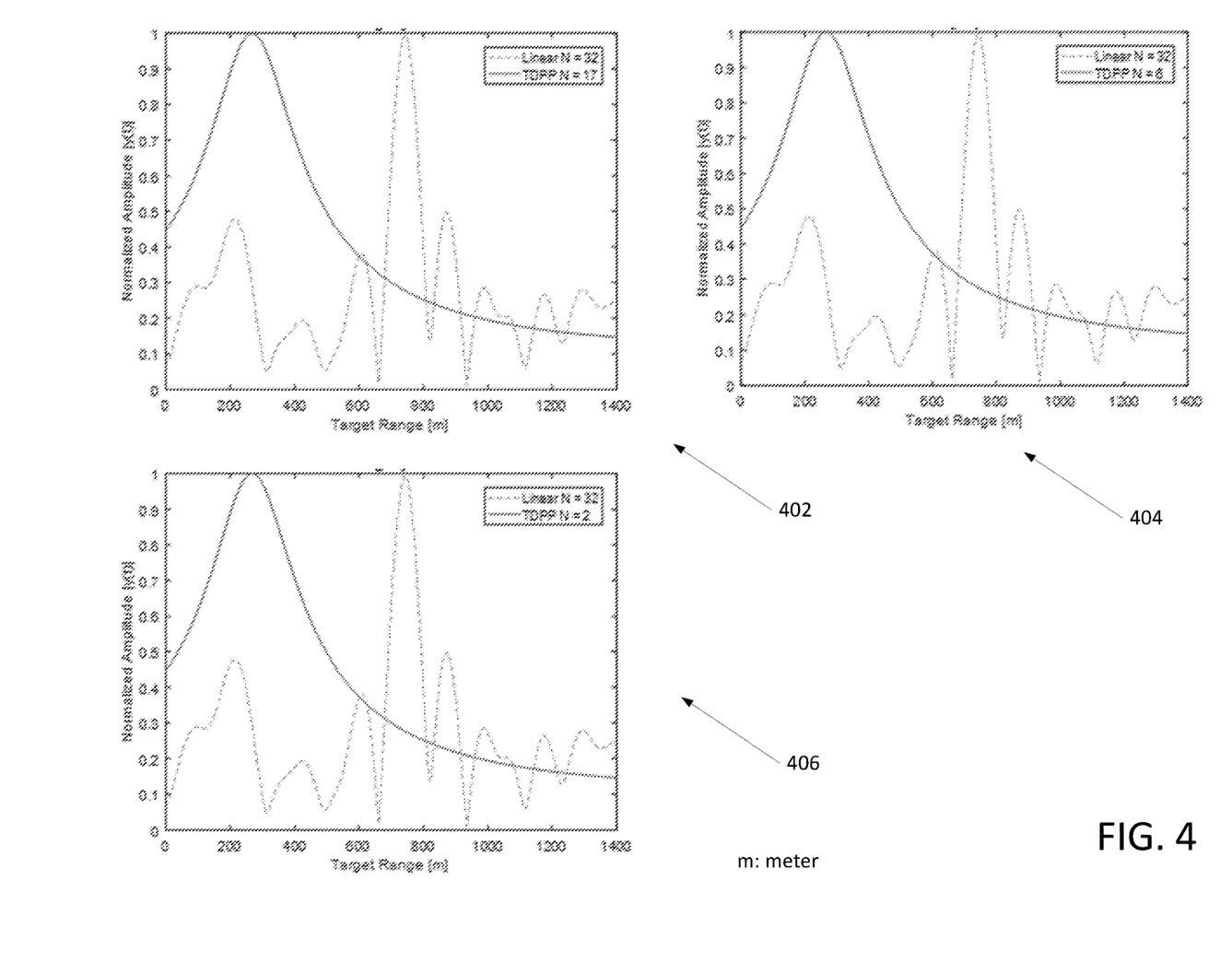
FIG. 4 illustrates graphs comparing when the signal strength and noise power are at an equal, average level.

For illustrative purposes, FIG. 4 illustrates graphs 402, 404 and 406 comparing when the signal strength and noise power are at an equal, average level. This high noise environment is true when the SNR=0 dB. Graphs 402, 404, 406 compare linear processing to TDPP when the N frequency samples are 17, 6, and 2 respectively.

As the SNR increases, TDPP becomes commensurate with the linear processing of a much larger array. If the signal processor employs coherent burst averaging, then the SNR and range resolution improves. In this context, burst averaging refers to processing multiple bursts returned from a source separately, then coherently integrating them to achieve an average measurement, while still preserving the waveform's phase information.

Figure 5:
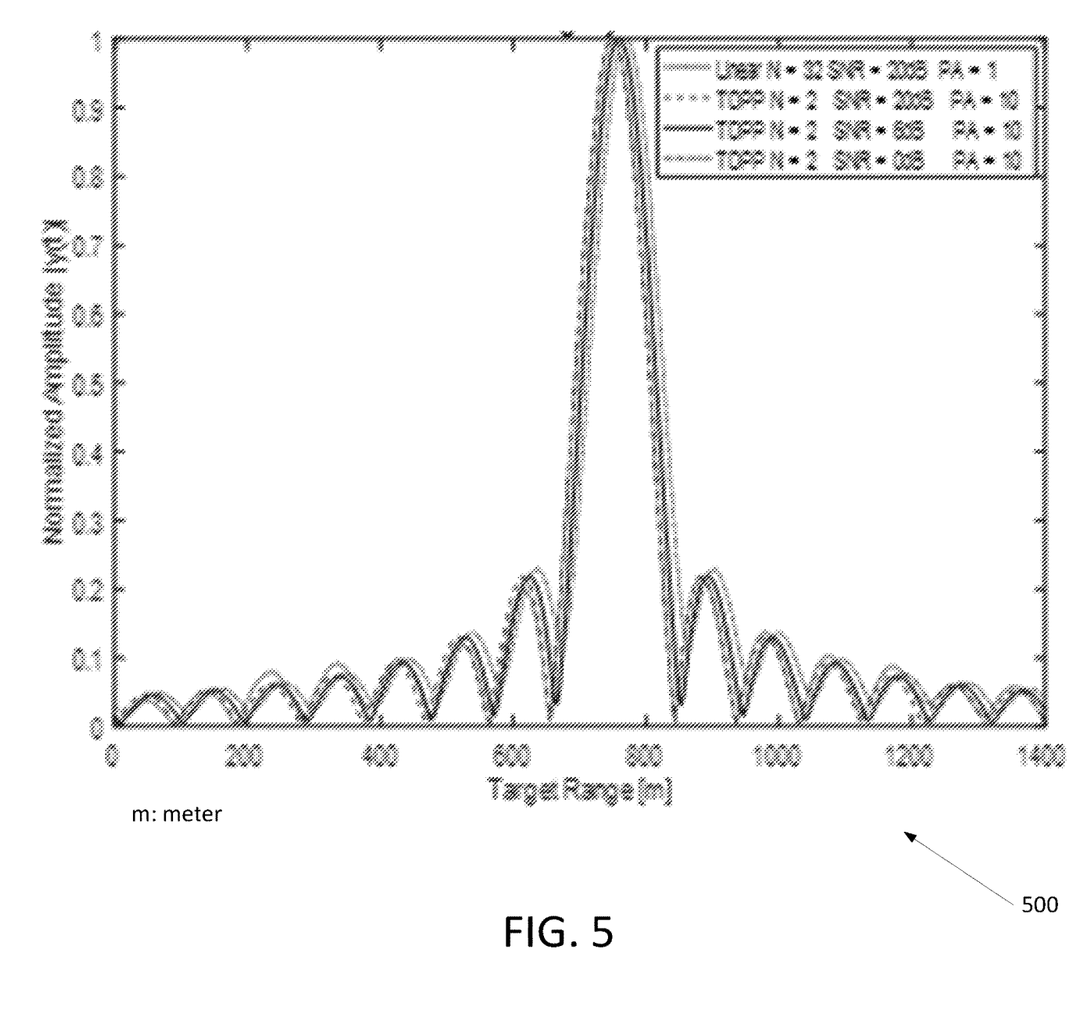
FIG. 5 is a graph illustrating the coherent integration of ten bursts for a variety of SNR cases.

FIG. 5 is a graph 500 illustrating the coherent integration of ten bursts for a variety of SNR cases. When compared to a single burst from linear processing using N=32 frequency samples, coherently averaging ten bursts for TDPP significantly improves the performance of the range estimate in all noise environments observed. A longer collection time is used, since the processor waits for all pulses to be returned from the source. For TDPP using N=2, this corresponds to a minimum of 2×IPP×PA seconds to receive all the information used for processing. The linear processing technique has to wait a minimum of 32 inter-pulse periods to produce a range estimate, while TDPP for N=2 and PA=10 uses a minimum of 20 inter-pulse periods to achieve a range estimate commensurate with linear processing. Therefore, range extraction with TDPP can be produced faster and with less frequency resources when compared to standard processing, with very little tradeoff. When more bursts used for averaging, the range estimate using TDPP becomes more accurate.

Figure 5X:
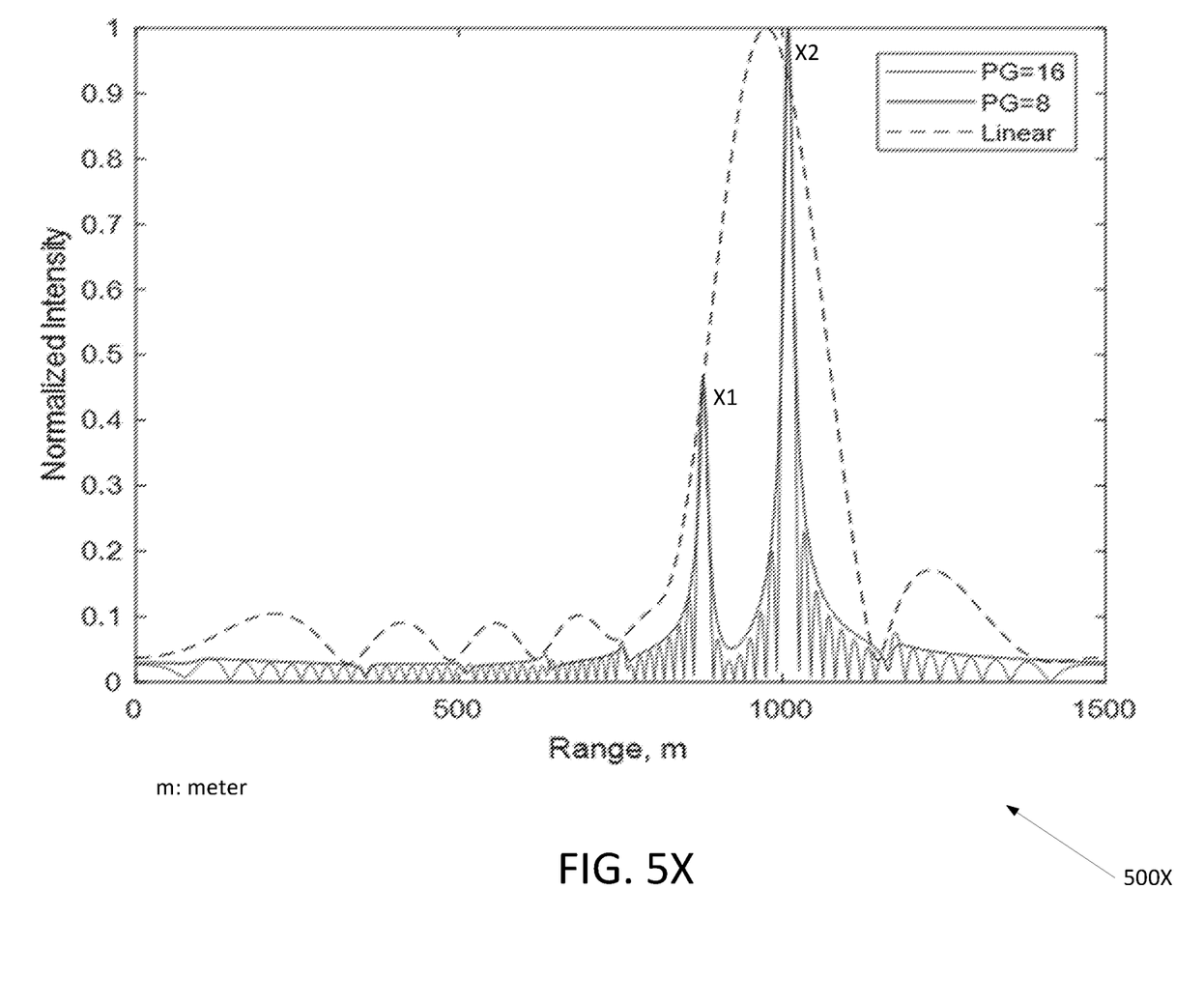
FIG. 5X is a graph illustrating multiplicative processing of measurements from two targets located at ranges of 1000 m and 875 m, respectively.

FIG. 5X is a graph 500X illustrating multiplicative processing of measurements from two targets located at ranges of 1000 m and 875 m, respectively. As shown by the graph, the magnitude of the echo from the closer target (X1, 875 m) is one-half the magnitude of the echo from the distant target (X2, 1000 m). In some implementations, measurements for the targets are obtained at 8 different frequencies that are separated by a frequency increment of 0.1 MHz, for a total bandwidth of 0.8 MHz. The measurements from the 8 frequencies are processed multiplicatively with two different processing gains (PG) of 8 and 16. Multiplicative processing with PG=8 generates an output equivalent to a total bandwidth of 8×0.8=6.4 MHz. Multiplicative processing with PG=16 generates an output equivalent to a total bandwidth of 16×0.8=12.8 MHz. In both cases, the graph 500X shows that the two targets are clearly discernible at X1 and X2. The location of the two targets in range matches their true locations. The magnitudes of the two targets are also preserved by multiplicative processing.

Although two targets are shown in the above example, in some implementations, a plurality of such geographically proximate targets, e.g., targets that can be detected simultaneously by the sensor array, are discerned using multiplicative processing. This includes estimating the locations of each of the plurality of targets in the range, or preserving the magnitudes of the targets, or both.

The graph 500X also shows the output when the 8 frequencies are processed linearly. In the latter case, the output from the two targets coalesce and are clearly not discernible. Accordingly, multiplicative processing provides improved range resolution that allows separation and identification of two or more targets that are located close to one other, when conventional linear processing fails.

Figure 6:
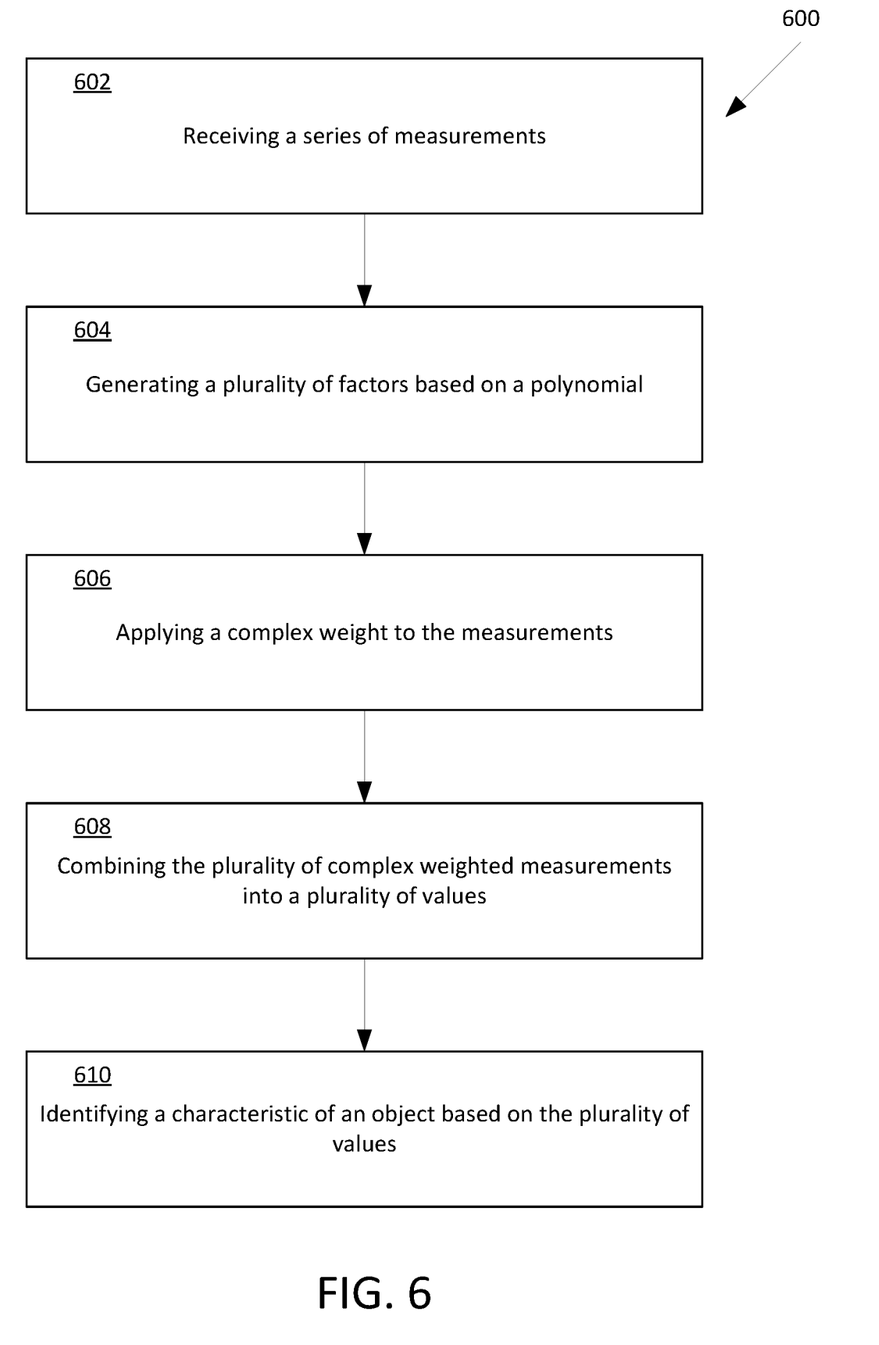
FIG. 6 is a flowchart of an exemplary process for beamforming and range profiling.

FIG. 6 is a flowchart of an exemplary process 600 for beamforming and range finding. The process 600 can be performed, for example, by a computer system coupled to a sensor array. In some implementations, the process 600 is performed by the computer 108 to process signals received by the sensor array 104.

The process 600 receives 602 a series of measurements. The series of measurements may be representative of frequency or spatial samples provided by a sensor array. For example, as described above, the frequency samples from sensor array 104 are processed by ADC 106 to produce the series of measurements, which are then received by computer 108.

The process 600 generates 604 a plurality of factors for a polynomial. For example, the computer 106 generates a plurality of factors for a polynomial as described with respect to equations (2)-(9). As discussed above, the polynomial may be selected based on the type of outcome expected from the process.

The process 600 applies 606 complex weights to the measurements based on the plurality of factors. For example, the computer 108 applies the complex weights as discussed with respect to equation (10).

The process 600 combines 608 the plurality of complex weighted measurements into a plurality of values. For example, the computer 108 combines the complex weighted measurements into a plurality of values.

The process 600 identifies 610 a characteristic of an object detected by the sensor array based on the plurality of values. For example, the computer 108 is used to determine a direction of arrival or a range to the object 102 that is detected by the sensory array 104.

Figure 7:
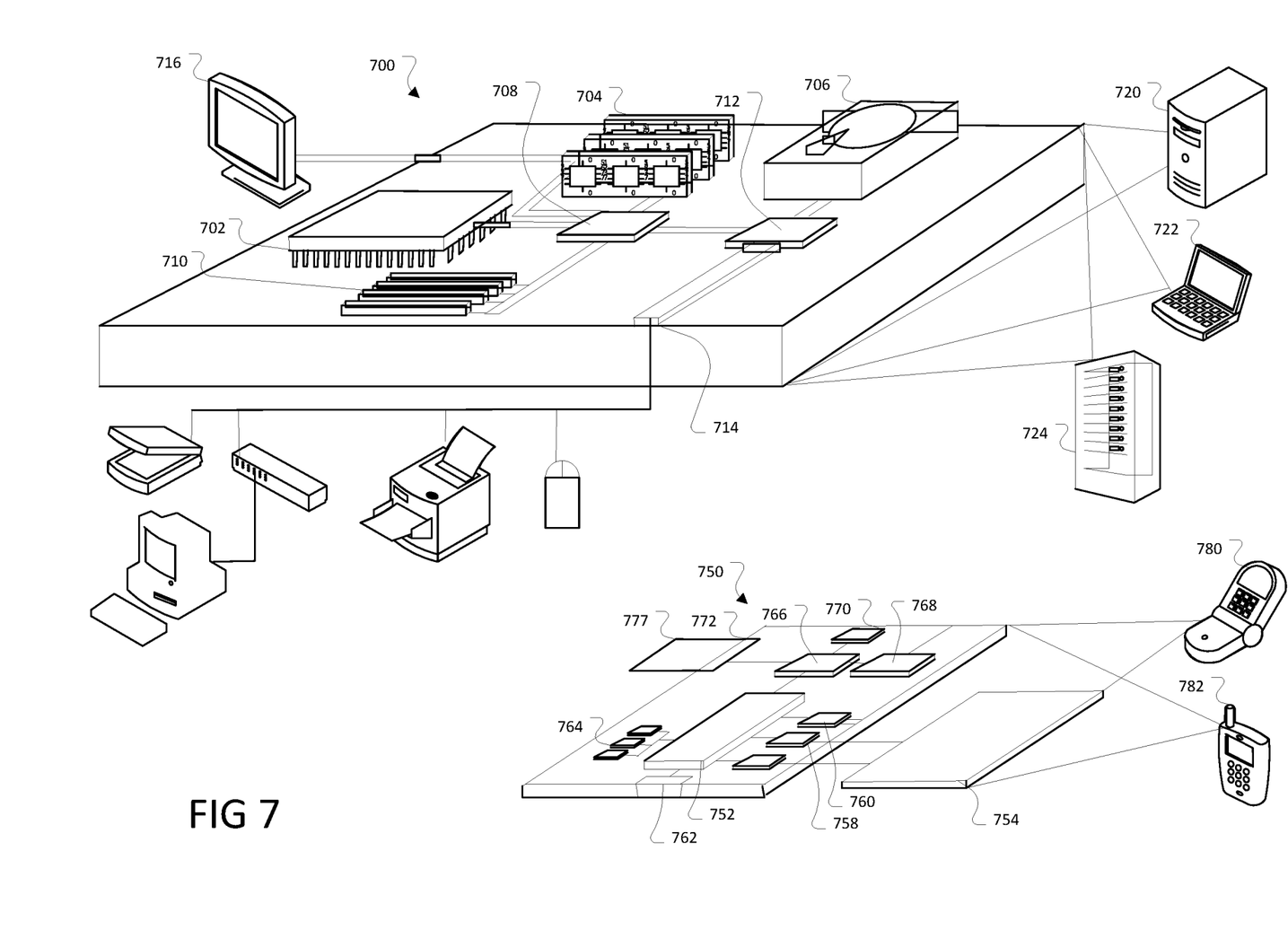
FIG. 7 shows an example of example computing device and example mobile computing device, which can be used to implement one or more of the techniques described herein.

FIG. 7 shows an example of a computing device 700 and example mobile computing device 750, which can be used to implement one or more of the techniques described herein. For example, a portion or all of the operations of the computer 108 may be executed by the computing device 700 and/or the mobile computing device 750. Computing device 700 is intended to represent various forms of digital computers, including, e.g., laptops, desktops, workstations, personal digital assistants, servers, blade servers, mainframes, and other appropriate computers. Computing device 750 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 700 includes processor 702, memory 704, storage device 706, high-speed interface 708 connecting to memory 704 and high-speed expansion ports 710, and low speed interface 712 connecting to low speed bus 714 and storage device 706. Each of components 702, 704, 706, 708, 710, and 712, are interconnected using various busses, and can be mounted on a common motherboard or in other manners as appropriate. Processor 702 can process instructions for execution within computing device 700, including instructions stored in memory 704 or on storage device 706 to display graphical data for a GUI on an external input/output device, including, e.g., display 716 coupled to high speed interface 708. In other implementations, multiple processors and/or multiple busses can be used, as appropriate, along with multiple memories and types of memory. Also, multiple computing devices 700 can be connected, with each device providing portions of the necessary operations (e.g., as a server bank, a group of blade servers, or a multi-processor system).

Memory 704 stores data within computing device 700. In one implementation, memory 704 is a volatile memory unit or units. In another implementation, memory 704 is a non-volatile memory unit or units. Memory 704 also can be another form of computer-readable medium (e.g., a magnetic or optical disk. Memory 704 may be non-transitory.) Storage device 706 is capable of providing mass storage for computing device 700.

In one implementation, storage device 706 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 704, storage device 706, memory on processor 1302, and the like.)

High-speed controller 708 manages bandwidth-intensive operations for computing device 1300, while low speed controller 712 manages lower bandwidth-intensive operations. Such allocation of functions is an example only. In one implementation, high-speed controller 1308 is coupled to memory 704, display 716 (e.g., through a graphics processor or accelerator), and to high-speed expansion ports 710, which can accept various expansion cards (not shown). In the implementation, low-speed controller 712 is coupled to storage device 706 and low-speed expansion port 714. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 700 can be implemented in a number of different forms, as shown in the figure. For example, it can be implemented as standard server 720, or multiple times in a group of such servers. It also can be implemented as part of rack server system 724. In addition or as an alternative, it can be implemented in a personal computer (e.g., laptop computer 722.) In some examples, components from computing device 700 can be combined with other components in a mobile device (not shown), e.g., device 750. Each of such devices can contain one or more of computing device 700, 750, and an entire system can be made up of multiple computing devices 700, 750 communicating with each other.

Computing device 750 includes processor 752, memory 764, an input/output device (e.g., display 754, communication interface 766, and transceiver 768) among other components. Device 750 also can be provided with a storage device, (e.g., a microdrive or other device) to provide additional storage. Each of components 750, 752, 764, 754, 766, and 768, are interconnected using various buses, and several of the components can be mounted on a common motherboard or in other manners as appropriate.

Processor 752 can execute instructions within computing device 750, including instructions stored in memory 764. The processor can be implemented as a chipset of chips that include separate and multiple analog and digital processors. The processor can provide, for example, for coordination of the other components of device 750, e.g., control of user interfaces, applications run by device 750, and wireless communication by device 750.

Processor 752 can communicate with a user through control interface 758 and display interface 756 coupled to display 754. Display 754 can be, for example, a TFT LCD (Thin-Film-Transistor Liquid Crystal Display) or an OLED (Organic Light Emitting Diode) display, or other appropriate display technology. Display interface 756 can comprise appropriate circuitry for driving display 754 to present graphical and other data to a user. Control interface 758 can receive commands from a user and convert them for submission to processor 752. In addition, external interface 762 can communicate with processor 742, so as to enable near area communication of device 750 with other devices. External interface 762 can provide, for example, for wired communication in some implementations, or for wireless communication in other implementations, and multiple interfaces also can be used.

Memory 764 stores data within computing device 750. Memory 764 can be implemented as one or more of a computer-readable medium or media, a volatile memory unit or units, or a non-volatile memory unit or units. Expansion memory 774 also can be provided and connected to device 750 through expansion interface 772, which can include, for example, a SIMM (Single In Line Memory Module) card interface. Such expansion memory 774 can provide extra storage space for device 750, or also can store applications or other data for device 750. Specifically, expansion memory 774 can include instructions to carry out or supplement the processes described above, and can include secure data also. Thus, for example, expansion memory 774 can be provided as a security module for device 750, and can be programmed with instructions that permit secure use of device 750. In addition, secure applications can be provided through the SIMM cards, along with additional data, (e.g., placing identifying data on the SIMM card in a non-hackable manner.) The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 764, expansion memory 774, and/or memory on processor 752), which can be received, for example, over transceiver 768 or external interface 762.

Device 750 can communicate wirelessly through communication interface 766, which can include digital signal processing circuitry where necessary. Communication interface 766 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 768. In addition, short-range communication can occur, e.g., using a Bluetooth®, Wi-Fi, or other such transceiver (not shown). In addition, GPS (Global Positioning System) receiver module 770 can provide additional navigation- and location-related wireless data to device 750, which can be used as appropriate by applications running on device 750. Sensors and modules such as cameras, microphones, compasses, accelerators (for orientation sensing), etc. may be included in the device.

Device 750 also can communicate audibly using audio codec 760, which can receive spoken data from a user and convert it to usable digital data. Audio codec 760 can likewise generate audible sound for a user, (e.g., through a speaker in a handset of device 750.) Such sound can include sound from voice telephone calls, can include recorded sound (e.g., voice messages, music files, and the like) and also can include sound generated by applications operating on device 750.

Computing device 750 can be implemented in a number of different forms, as shown in the figure. For example, it can be implemented as cellular telephone 780. It also can be implemented as part of smartphone 782, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising,
receiving, from an analog to digital converter, a series of measurements representing frequency samples and spatial samples corresponding to signals obtained from a sensor array, the signals associated with one or more objects in motion that are detected by the sensor array;
generating a plurality of factors by projecting the series of measurements over a plurality of steering vectors corresponding to a range of values of a characteristic associated with the one or more objects, wherein each factor of the plurality of factors corresponds to a measurement of the series of measurements and is weighted by a complex weight corresponding to a factorized polynomial;
combining the plurality of factors to obtain a plurality of values; and
identifying the characteristic associated with the one or more objects detected by the sensor array based on the plurality of values.

2. The method of claim 1, wherein the characteristic is one of a direction of arrival or a range.

3. The method of claim 1, wherein generating the plurality of factors includes determining a number of the series of measurements to use based on a signal to noise ratio.

4. The method of claim 3, further comprising applying burst averaging to the series of measurements.

5. The method of claim 1, further comprising selecting the factorized polynomial based on a target resolution.

6. The method of claim 1, further comprising:
identifying, based on the plurality of values, a plurality of proximate objects that are simultaneously detected by the sensor array, wherein the identifying comprises separately identifying each of the plurality of proximate objects at a respective distance.

7. A non-transitory computer storage medium encoded with computer program instructions that, when executed by one or more computers, cause the one or more computers to perform operations comprising:
receiving, from an analog to digital converter, a series of measurements representing frequency samples and spatial samples corresponding to signals obtained from a sensor array, the signals associated with one or more objects in motion that are detected by the sensor array;
generating a plurality of factors by projecting the series of measurements over a plurality of steering vectors corresponding to a range of values of a characteristic associated with the one or more objects, wherein each factor of the plurality of factors corresponds to a measurement of the series of measurements and is weighted by a complex weight corresponding to a factorized polynomial;
combining the plurality of factors to obtain a plurality of values; and
identifying the characteristic associated with the one or more objects detected by the sensor array based on the plurality of values.

8. The non-transitory computer storage medium of claim 7, wherein the characteristic is one of a direction of arrival or a range.

9. The non-transitory computer storage medium of claim 7, wherein generating the plurality of factors includes determining a number of the series of measurements to use based on a signal to noise ratio.

10. The non-transitory computer storage medium of claim 9, wherein the operations further comprise applying burst averaging to the series of measurements.

11. The non-transitory computer storage medium of claim 7, wherein the operations further comprise selecting the factorized polynomial based on a target resolution.

12. The non-transitory computer storage medium of claim 7, wherein the operations further comprise:
identifying, based on the plurality of values, a plurality of proximate objects that are simultaneously detected by the sensor array, wherein the identifying comprises separately identifying each of the plurality of proximate objects at a respective distance.

13. A system comprising:
one or more computers and one or more storage devices storing instructions that are operable, when executed by the one or more computers, to cause the one or more computers to perform operations comprising:
receiving, from an analog to digital converter, a series of measurements representing frequency samples and spatial samples corresponding to signals obtained from a sensor array, the signals associated with one or more objects in motion that are detected by the sensor array;
generating a plurality of factors by projecting the series of measurements over a plurality of steering vectors corresponding to a range of values of a characteristic associated with the one or more objects, wherein each factor of the plurality of factors corresponds to a measurement of the series of measurements and is weighted by a complex weight corresponding to based on a factorized polynomial;

combining the plurality of factors to obtain a plurality of values; and identifying the characteristic associated with the one or more objects detected by the sensor array based on the plurality of values.

14. The system of claim 13, wherein the characteristic is one of a direction of arrival or a range.

15. The system of claim 13, wherein generating the plurality of factors includes determining a number of the series of measurements to use based on a signal to noise ratio.

16. The system of claim 15, wherein the operations further comprise applying burst averaging to the series of measurements.

17. The system of claim 13, wherein the operations further comprise selecting the factorized polynomial based on a target resolution.

18. The system of claim 13, wherein the operations further comprise:

identifying, based on the plurality of values, a plurality of proximate objects that are simultaneously detected by the sensor array, wherein the identifying comprises separately identifying each of the plurality of proximate objects at a respective distance.

19. The method of claim 1, wherein combining the plurality of factors to obtain the plurality of values comprises:

applying array product processing to at least one combination of the plurality of factors.

20. The method of claim 19, wherein the at least one combination of the plurality of factors comprises at least two factors.

* * * * *

UNITED STATES PATENT AND TRADEMARK OFFICE
CERTIFICATE OF CORRECTION

PATENT NO. : 11,953,584 B2
APPLICATION NO. : 17/257539
DATED : April 9, 2024
INVENTOR(S) : Dayalan P. Kasilingam, Matthew J. Curtis and Murilo Souza Silva, Jr.

Page 1 of 1

It is certified that error appears in the above-identified patent and that said Letters Patent is hereby corrected as shown below:

In the Claims

Column 15, Line 1, in Claim 13:
After "to" delete "based on".

Signed and Sealed this
Twenty-seventh Day of August, 2024

Katherine Kelly Vidal
*Director of the United States Patent and Trademark Office*